United States Patent [19]

Horwitz et al.

[11] Patent Number: 5,110,474

[45] Date of Patent: May 5, 1992

[54] METHOD FOR LIQUID CHROMATOGRAPHIC EXTRACTION OF STRONTIUM FROM ACID SOLUTIONS

[75] Inventors: E. Philip Horwitz, Naperville; Mark L. Dietz, Evanston, both of Ill.

[73] Assignee: Arch Development Corporation, Chicago, Ill.

[21] Appl. No.: 507,419

[22] Filed: Apr. 9, 1990

[51] Int. Cl.$^5$ ............................................. B01D 15/08
[52] U.S. Cl. ..................... 210/635; 210/634; 210/656; 210/198.2; 252/626; 252/627; 252/631; 423/2; 423/49; 423/157; 423/178; 423/249; 423/DIG. 14
[58] Field of Search ............ 210/634, 635, 656, 198.2; 423/49, 157, 178, DIG. 14, 2, 249; 252/626, 627, 631

[56] References Cited

U.S. PATENT DOCUMENTS

| | | | |
|---|---|---|---|
| 3,827,986 | 8/1974 | Charlton | 423/2 |
| 3,970,583 | 7/1976 | Panek | 423/2 |
| 4,001,387 | 1/1977 | Barak | 423/2 |
| 4,162,231 | 7/1979 | Horwitz | 423/2 |
| 4,548,790 | 10/1985 | Horwitz et al. | 423/9 |
| 4,574,072 | 3/1986 | Horwitz et al. | 423/9 |
| 4,738,834 | 4/1988 | Moore | 423/2 |
| 4,835,107 | 5/1989 | Horwitz et al. | 436/82 |
| 4,837,110 | 6/1989 | Kuhlmann | 423/2 |
| 5,023,061 | 6/1991 | Snyder | 423/2 |

FOREIGN PATENT DOCUMENTS 0294528 12/1988 European Pat. Off. ......... 210/198.2

OTHER PUBLICATIONS

C. R. Porter, et al., "Determination of Radiostrontium in Food and Other Environmental Samples", *Environmental Science & Technology*, vol. 1, pp. 745–750, (1967).
T. Kimura, et al., "Separation of Strontium Ion from a Large Amount of Calcium Ion by the Use of a Macrocyclic Ether", *Chemistry Letters*, (1977), pp. 563–564.
T. Kimura, et al., "Separation of Strontium-89 and -90 from Calcium in Milk with a Macrocyclic Ether", *Analytical Chemistry*, vol. 51, (1979), pp. 1113–1116.
E. A. Filippov, et al., "Extraction of Alkaline-Earth Metals from Nitric Acid Solutions with the Crown Ether Dicyclohexyl-18-Crown-6", *Radiokhimiya*, vol. 14, (1982), pp. 177–181.
E. Blasius, et al., "Separation of Strontium from Nuclear Waste Solutions by Solvent Extraction with Crown Ethers", *Journal of Radioanalytical and Nuclear Chemistry Articles*, vol. 89/2, (1985), pp. 389–398.
R. G. Shuler, et al., "The Extraction of Cesium and Strontium from Acidic High Activity Nuclear Waste Using a Purex Process Compatible Organic Extractant", *Solvent Extraction and Ion Exchange*, vol. 3, (1985) pp. 567–604.
W. J. McDowell, "Crown Ethers as Solvent Extraction Reagents: Where Do We Stand?", *Separation Science and Technology*, vol. 23, (1988), pp. 1251–1268.

*Primary Examiner*—Ernest G. Therkorn
*Attorney, Agent, or Firm*—Reinhart, Boerner

[57] ABSTRACT

A method and apparatus for extracting strontium and technetium values from biological, industrial and environmental sample solutions using a chromatographic column is described. An extractart medium for the column is prepared by generating a solution of a diluent containing a Crown ether and dispersing the solution on a resin substrate material. The sample solution is highly acidic and is introduced directed to the chromatographic column and strontium or technetium is eluted using deionized water.

7 Claims, 1 Drawing Sheet

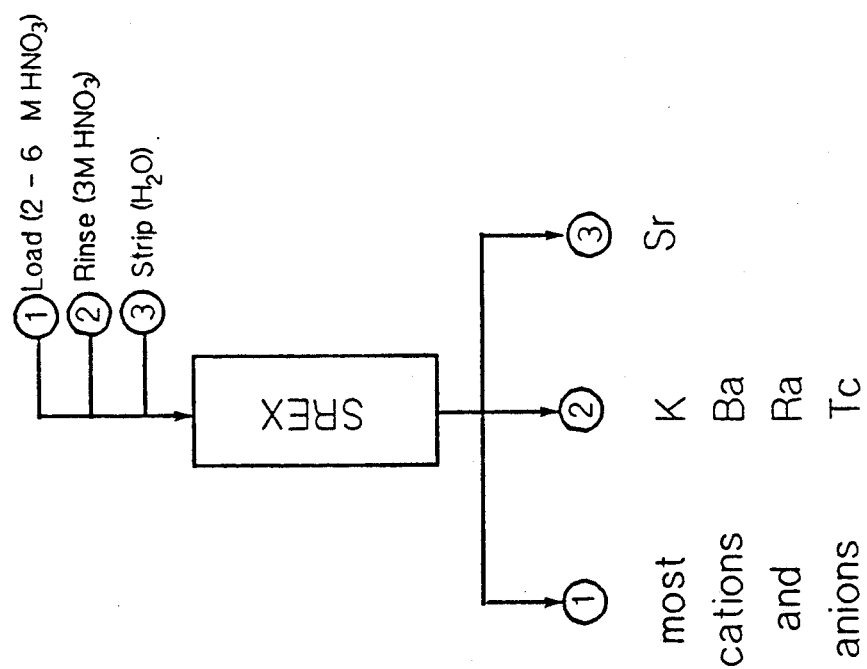

METHOD FOR LIQUID CHROMATOGRAPHIC EXTRACTION OF STRONTIUM FROM ACID SOLUTIONS

CONTRACTUAL ORIGIN OF THE INVENTION

The U.S. Government has rights in this invention pursuant to Contract No. W-31-109-ENG-38 between the U.S. Department of Energy and the University of Chicago.

BACKGROUND OF THE INVENTION

The present invention is concerned generally with a method and apparatus for selectively extracting strontium values from acidic aqueous solutions. More particularly, the invention is concerned with a method and apparatus for selectively extracting strontium and technetium values from biological, commercial waste and environmental samples by use of a chromatographic column.

Growing public health and safety concerns over the use of nuclear technology, both in the production of power and in the manufacture of nuclear weapons, have made increasingly important reliable methods for the determination of various radiostopes in environmental and biological samples. The beta emitting isotope $^{90}Sr$, produced by nuclear fission, is of particular concern. Because of its chemical similarity to calcium, $^{90}Sr$ released to the environment can quickly enter the food chain. Ultimately, the $^{90}Sr$ can be permanently incorporated into the inorganic matrix of human bones. There is, therefore, a clear need for an analytical procedure and methodology suitable for use in the routine monitoring of persons whose activities expose them to the risk of internal contamination from this element and for the determination of the levels of radiostrontium in various environmental samples (e.g., soils, plants, natural waters, and waste streams).

Numerous prior methods have been described for performing such determinations. An essential feature of all of these methods is the separation and purification of the strontium, both to remove radiosotopes which may interfere with subsequent beta counting and to free it from the large quantities of inactive substances typically present, particularly calcium.

Typical past methods of separation of Ca and $^{90}Sr$ have relied upon the greater solubility of calcium nitrate in strong nitric acid solutions. This approach ultimately provides satisfactory results but requires numerous process steps, and repeated precipitations must be performed in order to achieve substantially complete recovery of $^{90}Sr$. Other methods of separation involve precipitation of strontium sulfate or strontium rhodizonate, sorption of strontium on an ion exchange resin from a solution of a chelating agent such as CYDTA or EDTA, and liquid-liquid extraction with organophosphorous acids. These methods, however, suffer from serious shortcomings. In the case of the precipitation and extraction methods, the extracted strontium is contaminated with significant amounts of calcium. Ion exchange processes require precise control of pH due to the narrow range of pH necessary to achieve adequate separation. Moreover, the acceptable pH extraction range is affected by the concentration of calcium present which gives rise to different pH ranges needed for effectively treating different waste samples.

In the recent past, attempts have been made to use macrocyclic polyethers to separate strontium and calcium. Such work has involved a chloroform solution of dicyclohexano-18-Crown-6 to separate strontium traces from macroscopic amounts of calcium ions. This method has also been applied to the determination of the relative amounts of $^{89}Sr$ and $^{90}Sr$ in milk. In another related process a combined procedure involving ion-exchange/extraction/precipitation has been developed which incorporates the extraction of strontium picrate into a methylene chloride solution of dicyclohexano-18-Crown-6 to isolate traces of strontium from milk and drinking water. In a related process involving chromatographic separation of alkaline earths, solutions are used consisting of various polyethers in chlorinated hydrocarbons dispersed onto siliconized kieselguhr as a stationary phase. Separation of calcium and strontium proceeds by use of either dibenzo-18-Crown-6 or dicyclohexano-18-Crown-6. Unfortunately, each of these Crown ether based strontium extraction procedures is wholly ineffective for relatively acidic samples. This is a particularly troublesome shortcoming since it is often most desirable to digest biological or environmental samples or leach the raw sample using an acid to produce a feed solution for extraction, and such a feed solution is often several molar in acid.

It is therefore an object of the invention to provide a novel method and apparatus for separating strontium or technetium values from biological, commercial waste and environmental samples.

It is another object of the invention to provide an improved method and composition of matter for extracting strontium or technetium from various waste material samples.

It is a further object of the invention to provide a novel method of preparing an extractant media for a liquid chromatographic column based on a solution mixture of a diluent and a Crown ether dispersed on a resin substrate material.

It is still another object of the invention to provide an improved method and apparatus for extracting strontium or technetium dissolved in a strongly acidic solution.

It is an additional object of the invention to provide a novel method of chromatographic extraction of strontium and technetium values from aqueous nitric acid solutions having up to about 6M nitric acid concentrations.

It is yet a further object of the invention to provide an improved method for enhanced extraction of strontium or technetium using a sample loading and washing solution consisting of 2MHNO$_3$/0.5M Al(NO$_3$)$_3$.

Other objects and advantages of the present invention, together with the organization and manner of operation thereof will become apparent from the following detailed description of preferred embodiments taken in conjunction with the accompanying drawing wherein:

BRIEF DESCRIPTION OF THE DRAWING

FIG. 1 illustrates a flow chart of chromatographic extraction of strontium and/or technetium from acidic solutions.

DETAILED DESCRIPTION OF PREFERRED EMBODIMENTS

The above enumerated objects of the invention are achieved using an extractant in a chromatographic column wherein the extractant comprises a Crown ether in selected diluents. FIG. 1 illustrates schematically the method of a preferred extraction process. Substantial details concerning preparation of the extractant are set forth in a companion application U.S. Ser. No. 506,125 filed contemporaneously with the subject application. This companion application is assigned to the same entity, has the same inventors; and said companion application is incorporated by reference herein.

A preferred extractant consists of 1.0M bis 4,4'(5')[t-butylcyclohexano]18-Crown-6 (also expressed hereinafter as either di-t-butylcyclohexono-18-Crown-6 or as DtBuCH18C6) in 1-octanol as a diluent. In general, the macrocyclic polyether can be any of the dicyclohexano-Crown ethers, such as cis-dicyclohexano-18-Crown-6 (also expressed hereinafter as DCH18C6) and bis-methylcyclohexano-18-Crown-6 (also expressed hereinafter as DMeCH18C6). The preferred Crown ether cited above can be generally expressed by the formula: 4,4'(5')[R,R'dicyclohexano]-18-Crown-6, where R and R' are one or more members selected from the groups consisting of H and straight chains or branched alkyls containing 1 to 12 carbon atoms, such as, methyl, propyl, isobutyl, t-butyl, hexyl and heptyl. A preferred Crown ether includes the above listed DMeCH18C6 and the most preferred is bis 4,4'(5')[(t-butyl)cyclohexano]-18-Crown-6. As mentioned hereinbefore, further details concerning the Crown ethers are included in the copending incorporated application U.S. Ser. No. 506,125.

The diluents for the Crown ethers are also explained in detail in the incorporated copending application, including extensive data illustrating the extractant solutions in the preferred embodiments. Generally, the diluents include alcohols, ketones, carboxylic acids and esters. As is understood by one of ordinary skill in the art, this is qualified by the fact that the diluent should have limited solubility in water since the extractant is exposed to substantial water volumes during the chromatographic extraction process of the invention. This qualification also applies to the selected Crown ether dissolved in the diluent. Examples in the copending application also provide illustrations of the liquid/liquid extraction efficiency over a wide range of acidity conditions. Subject to the qualifications concerning diluent and Crown ether water solubility, comparisons were made between the extraction results using the chromatographic column and liquid/liquid extraction in the copending application, and excellent correlation has been found.

Preparation of a chromatographic separation column involved use of a raw Amberlite XAD-7 resin substrate material (manufactured by Rohm & Haas, Philadelphia, Pa.) and treated in a conventional manner to remove all traces of preservatives (for example, see U.S. Pat. No. 4,835,107 which is incorporated by reference herein). Ten grams of the purified resin substrate material were slurried in methanol and 6.26 grams of a 1M solution of DtBuCH18C6 in 1-octanol were added. The resulting mixture was gently stirred for several minutes, and the methanol was removed under vacuum at 40° C. to yield about 16 g of the Crown ether/diluent dispersed on the resin substrate material. To prepare the chromatographic column, a portion of this resin substrate material was slurried in 3M nitric acid and aliquots of this slurry were transferred under nitrogen pressure to a 10 cm glass Bio-Rad column (1.4 mm inside diameter) equipped with polypropylene fittings manufactured under the trademark "Cheminert" by Chromatronix, Inc., Berkeley, Calif. When the desired bed height had been reached (corresponding to a bed volume of about 0.6 cm$^3$), the resin substrate material was resettled by backwashing. The resin substrate material was then rinsed with several bed volumes of 3M nitric acid.

Chromatographic columns can also be prepared in 23 cm long glass Pasteur pipettes having a small glass wool plug in the bottom and a layer of 80/100 mesh glass beads on top of the resin substrate material to prevent disruption of the bed by sample introduction. Because these pipettes lack a reservoir, sample solutions were introduced using a small polyethylene funnel attached to the top of the pipette via a short length of vinyl tubing.

Distribution ratios for Sr and Tc values were measured radiometrically using conventional procedures, and all measurements were performed at 25° C. Gamma and beta counting were performed on a Beckmann Biogamma Counter and a Packard Model 2200 Liquid Scintillation Counter, respectively. Assessment of non-radioactive elements was performed using well known inductively coupled plasma atomic emission spectroscopy.

As stated hereinbefore, the basic desirable conditions for the sorption and elution of Sr in an extraction chromatographic system were ascertainable by examining its behavior in the corresponding liquid-liquid system (see copending incorporated application). A log-log plot of the distribution ratio of strontium (defined as the ratio of the organic phase concentration of strontium to its aqueous phase concentration), $D_{Sr}$, versus Crown ether concentration in n-octanol yielded a straight line of near-unit slope, consistent with the following extraction equilibrium equation:

$$Sr^{2+}(aq) + Crown_{(org)} + 2NO_3^-(aq) \rightleftharpoons Sr(Crown)(NO_3)_{2(org)}$$

As shown in the incorporated copending application, log-log plots of $D_{Sr}$ versus nitric acid concentration at several Crown ether concentrations also yielded straight lines over the range 0.01 to 3M. Above 3M, however, appreciable extraction of nitric acid by the Crown ether occurs, leading to a slight curvature in the plots. These results indicated adequate retention of strontium (i.e., $D \geq 100$) would occur upon using a stationary phase consisting of about 1M DtBuCH18C6 in n-octanol and a load solution containing 3M nitric acid. In addition, elution (i.e., $D < 0.01$) should be effected merely by using water, preferably deionized.

These expectations were confirmed by collection of data from a series of extraction chromatographic experiments in which tracer $^{85}$Sr was loaded onto a SREX column from 3M nitric acid, then eluted. The results are illustrated in Table I. In each case, $^{85}$Sr breakthrough was observed only after passage of at least 13 free column volumes of 3M acid. Moreover, less than 1% of the $^{85}$Sr introduced to the column was eluted in the first twenty free column volumes. In the presence of macro quantities (i.e., about twice the total column capacity) of calcium ion (as Ca(NO$_3$)$_2$), no significant difference in the elution behavior of strontium was observed. As expected, changing the eluent to deionized water resulted in the immediate elution of strontium. In one trial, for example, an aliquot of $^{85}$Sr was introduced to the column and 12 free column volumes of 3M nitric acid were passed through to simulate a column rinse. The eluent was then changed to deionized water.

Nearly 98% of the strontium originally introduced was eluted in the next 2.5 free column volumes.

TABLE I

Elution behavior of Sr on a SREX column in the presence and absence of macro amounts of $Ca^{2+}$ or $Sr^{2+}$

| Drop no. | Percent Sr Eluting | | |
|---|---|---|---|
| | Tracer Sr only | Tracer + Macro $Ca^{2+}$ | Tracer + Macro $Sr^{2+}$ |
| 1–85 | — | 0 | 0 |
| 86–170 | 0.02 | 0 | 0 |
| 171–255 | <0.01 | 0 | 1.09 |
| 256–340 | 0.03 | 0 | 13.9 |
| 341–425 | 0.22 | 0.11 | 21.0 |
| 426–510 | 0.79 | 0.38 | 16.0 |
| 511–595 | 1.94 | 1.13 | 11.7 |
| 596–680 | 3.58 | 2.69 | 9.64 |
| 681–765 | 5.81 | 4.27 | 6.54 |
| 766–850 | 7.86 | 6.76 | 5.29 |
| 851–935 | 9.47 | 8.97 | 3.88 |
| 936–1020 | 10.2 | 10.7 | 3.18 |
| 1021–1105 | 10.4 | 11.3 | 1.88 |
| 1106–1190 | 9.83 | 11.0 | 2.16 |
| 1191–1275 | 8.88 | 9.76 | 1.18 |
| 1276–1360 | 7.42 | 8.44 | 0.80 |
| 1361–1445 | 6.49 | 6.65 | 1.69 |
| 1446–1530 | 4.77 | 5.11 | 0.02 |
| 1531–1615 | 3.47 | 3.71 | 0.04 |

Conditions:
1M Di-t-butylcyclohexano-18-Crown-6 1-octanol on XAD-7
Pre-conditioned with 3M $HNO_3$; Eluent = 3M $HNO_3$
Bed Volume = 0.59 $cm^{-3}$; T = 25° C.
Fractions analyzed by gamma counting of $^{85}Sr$
Macro = 2 × total column capacity Strontium retention can be improved somewhat by use of 2M $HNO_3$/0.5M $Al(NO_3)_3$ for sample loading and column washing (see Table II). Under these conditions, less than 1% of the strontium tracer introduced is eluted in the first ~30 free column volumes. More than 99% of a calcium tracer will elute in the same volume. Thus, Sr/Ca separation is essentially complete. (Strontium/barium separation under the same conditions is not as efficient with ~80% of the initial barium eluting in the first 30 free column volumes.)

TABLE II

Elution Behavior of Sr, Ca, and Ba on a SREX Column

| Step | Eluent | Volume, mL | Cumulative Volume, mL | Net Counts (10 min.) | | | Cumulative Recovery (%) | | |
|---|---|---|---|---|---|---|---|---|---|
| | | | | Ca | Sr | Ba | Ca | Sr | Ba |
| Feed 1 | 2M $HNO_3$ + | 5 | 5 | 937 | 0 | 41 | 33 | 0 | 0.3 |
| Feed 2 | 0.5M $Al(NO_3)_3$ | 5 | 10 | 1400 | 7 | 2806 | 83 | 0.1 | 19.5 |
| Wash | 0.5M $Al(NO_3)_3$ | 5 | 15 | 444 | 7 | 4795 | 99 | 0.2 | 52.4 |
| Rinse-1 | 3M $HNO_3$ | 5 | 20 | 19 | 56 | 3953 | 99.5 | 0.9 | 79.5 |
| Rinse-2 | 3M $HNO_3$ | 5 | 25 | 5 | 179 | 2318 | 99.7 | 3.1 | 95.4 |
| Rinse-3 | 3M $HNO_3$ | 5 | 30 | 5 | 382 | 570 | 99.9 | 7.9 | 99.2 |
| Rinse-4 | 3M $HNO_3$ | 5 | 35 | — | 718 | 96 | — | 16.9 | 99.7 |
| Rinse-5 | 3M $HNO_3$ | 5 | 40 | — | 988 | 42 | — | 29.3 | 99.8 |
| Rinse-6 | 3M $HNO_3$ | 5 | 45 | — | 1289 | 47 | — | 45.4 | — |
| Rinse-7 | 3M $HNO_3$ | 5 | 50 | — | 996 | 41 | — | 57.9 | — |
| Rinse-8 | 3M $HNO_3$ | 5 | 55 | — | 1092 | 34 | — | 71.6 | — |
| Rinse-9 | 3M $HNO_3$ | 5 | 60 | — | 863 | 37 | — | 82.3 | — |
| Rinse-10 | 3M $HNO_3$ | 5 | 65 | — | 539 | 23 | — | 89.1 | — |
| Rinse-11 | 3M $HNO_3$ | 5 | 70 | — | 338 | 8 | — | 93.4 | — |

Conditions:
Stationary phase: 1M di-t-butylcyclohexano-18-Crown-6 in 1-octanol and Amberlite XAD-7
Pre-conditioning: 5 mL of 2M $HNO_3$/0.5M $Al(NO_3)_3$
Bed Volume: about 1.6 $cm^3$
T: 25° C.
Isotopes: $^{45}Ca$, $^{85}Sr$, $^{133}Ba$
Detection/Counting: gamma - $^{85}Sr$ and $^{133}Ba$; beta (liquid scintillation)-$^{45}Ca$ An evaluation was performed to determine the selectivity of the SREX column for strontium over many of the other elements often encountered in environmental samples and to verify that satisfactory Sr/Ca separation can be achieved for samples containing quantities of these elements well above trace levels. A 2.00 mL aliquot (~7-8 free column volumes) of a synthetic nuclear waste solution containing 25 metallic constitutents (Ag, Al, Ba (2.1×10$^{-4}$M), Ca (1.4×10$^{-3}$M), Cd, Ce, Cr, Cu, Eu, Fe, La, Mg, Mn, Mo, Na, Nd, Ni, Pd, Pr, Rh, Ru, Sm, Sr (1.4×10$^{-3}$M), Y, and Zr) was acidified to 3M in nitric acid and introduced to the column. The column was then rinsed with several portions of 3M nitric acid and the effluent collected in 150 drop fractions (each corresponding to ~10 free column volumes). Each fraction was then analyzed for all 25 elements by conventional ICP-AES, and results are shown in Table III.

TABLE III

Behavior of Dissolved Sludge Waste Components on a SREX Column

| Element | Percent of Total Measured Activity in Fraction | | | | | |
|---|---|---|---|---|---|---|
| | 1 | 2 | 3 | 4 | 5 | 6 |
| Inerts | | | | | | |
| Na | 81.3 | 18.7 | — | — | — | — |
| Mg | 83.9 | 16.1 | — | — | — | — |
| Al | 84.6 | 15.4 | — | — | — | — |
| Ca | 82.5 | 17.5 | — | — | — | — |
| Cr | 84.5 | 15.5 | — | — | — | — |
| Mn | 84.2 | 15.8 | — | — | — | — |
| Fe | 84.0 | 15.9 | 0.02 | <0.01 | — | — |
| Ni | 84.0 | 16.0 | — | — | — | — |
| Cu | 84.1 | 15.9 | — | — | — | — |
| Fission Products | | | | | | |
| Sr | — | — | 1.0 | 18.5 | 43.5 | 37.0 |
| Y | 84.3 | 15.7 | — | — | — | — |
| Zr | 83.7 | 16.2 | 0.2 | — | — | — |
| Mo | 83.6 | 16.4 | — | — | — | — |
| Ru | 74.3 | 24.7 | 1.1 | — | — | — |
| Rh | 82.9 | 17.1 | — | — | — | — |
| Pd | 77.5 | 22.5 | — | — | — | — |
| Ag | >83.3 | <16.7 | — | — | — | — |
| Cd | 84.8 | 15.2 | — | — | — | — |
| La | 84.0 | 16.0 | — | — | — | — |
| Ba | — | 33.3 | 62.2 | 4.4 | — | — |
| Rare Earths | | | | | | |
| Ce | 84.4 | 15.6 | — | — | — | — |
| Pr | 83.4 | 16.6 | — | — | — | — |
| Nd | 84.6 | 15.4 | — | — | — | — |

TABLE III-continued

Behavior of Dissolved Sludge
Waste Components on a SREX Column

| Element | Percent of Total Measured Activity in Fraction | | | | | |
|---|---|---|---|---|---|---|
| | 1 | 2 | 3 | 4 | 5 | 6 |
| Sm | 85.6 | 14.4 | — | — | — | — |
| Eu | 84.2 | 15.8 | — | — | — | — |

Conditions:
Column: 1M di-t-butylcyclohexano-18-Crown-6 in 1-octanol on Amberlite XAD-7 (~40% w/w)
Pre-conditioned with 3M $HNO_3$. Eluent = 3M $HNO_3$.
Bed Volume - 0.59 $cm^3$
T = 25° C
Sample: Dissolved sludge waste acidified to 3M with $HNO_3$ activity introduced.
Each fraction corresponds to 150 drops ~ about 10 free column volumes.
Analysis: All fractions analyzed by conventional ICP-AES For all but two of the test elements (Ba and Sr), ≧99% of that introduced to the column was found to elute in the first two fractions. No strontium was observed in either of these fractions and only ~1% in the third. For barium, over 95% eluted by the end of the third fraction. Thus, under the experimental conditions, it is possible to obtain essentially complete separation of strontium from all but one of the test elements. Obviously, for applications requiring a more complete Ba/Sr separation, the barium concentration could be further reduced either by eluting with a nitric acid solution of higher concentration (e.g., 6M) or by multiple passes of the sample through the column. For certain applications, however, where the objective is simply to reduce the sample mass sufficiently to eliminate the need for self-absorption corrections in beta counting, a single pass of the sample would be adequate. (The 2.00 mL aliquot of waste solution introduced to the column here, for example, contained about 400 mg of dissolved salts, while the strontium fraction collected contained only about 600 micrograms, a >99.8% mass reduction).

To determine the suitability of the SREX column for use in the routine monitoring of bioassay samples (i.e. urine and feces), aliquots of a Sr tracer were added to several urine samples selected at random from those submitted to the ANL Environment, Safety, and Health Department. After calcium phosphate co-precipitation, ashing of the sample through the column, dissolution of the residue in 2M $HNO_3$/0.5M $Al(NO_3)_3$, and passage of the sample through the column, the final sample solution was assayed for strontium. Recovery of the tracer was found to be satisfactory, and the accumulated data indicated a mean recovery value of 90%.

The copending application U.S. Ser. No. 506,125 incorporated by reference includes further examples of use of the invention for liquid/liquid extractions. As shown herein, preparation of extractant media using Crown ethers and diluents useful for liquid/liquid extraction and obtaining successful extraction in the same general manner as for liquid/liquid extraction, it will be understood by one of ordinary skill that the extractant operability demonstrated therein applies equally to extraction in the chromatographic column. This operability is subject to the previously mentioned qualification that the Crown ether/diluent has quite limited water solubility since such an extractant is exposed to substantial volumes of water during chromatographic column extraction processes.

While there have been illustrated herein various embodiments of the present invention, modifications will be apparent after study. As such, the scope of the invention should not be limited by the particular embodiments and the specific construction and examples described herein, but rather shall be defined by the appended claims and equivalents thereof.

What is claimed is:

1. A method for separating strontium and/or technetium values from a waste sample using a chromatographic separation column, comprising the steps of:
   preparing a nitric acid sample solution of at least about 0.01 Molarity comprising a dissolved form of said strontium and/or technetium values in said waste sample;
   passing said nitric sample solution through said separation column comprising a solution of a Crown ether in a diluent insoluble in water and capable of dissolving a substantial quantity of water with said Crown ether soluble therein, said Crown ether and diluent solution dispersed onto an inert resin substrate material in said separation column whereby said strontium and/or technetium values are extracted from said sample solution; and
   selectively eluting said strontium and/or technetium values by passing water through said separation column.

2. The method as defined in claim 1 wherein said strontium and/or technetium values are separable from calcium.

3. The method as defined in claim 2 wherein said strontium values are separable from barium values.

4. The method as defined in claim 1 further including the step of detecting the presence and quantity of said strontium values.

5. The method as defined in claim 1 wherein said biological and environmental samples are selected from the group consisting of a urine solution, a commercial waste solution, a nuclear waste solution and acidic solutions of dissolved waste.

6. The method as defined in claim 1 wherein strontium retention on said resin substrate material is enhanced by using a solution consisting essentially of 2M $HNO_3$/0.5M $Al(NO_3)_3$ for sample solution loading and washing of said chromatographic separation column.

7. The method as defined in claim 1 further including selectively eluting barium.

* * * * *